(12) United States Patent
Sawada (10) Patent No.: US 7,327,875 B2
(45) Date of Patent: Feb. 5, 2008

(54) METHOD AND APPARATUS FOR COLOR CONVERSION

(75) Inventor: Takayuki Sawada, Numazu (JP)

(73) Assignees: Kabushiki Kaisha Tosiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 849 days.

(21) Appl. No.: 10/721,101

(22) Filed: Nov. 26, 2003

(65) Prior Publication Data

US 2004/0105581 A1 Jun. 3, 2004

(30) Foreign Application Priority Data

Nov. 27, 2002 (JP) .............................. 2002-344317

(51) Int. Cl.
*G06K 9/00* (2006.01)
*G03F 3/08* (2006.01)

(52) U.S. Cl. ...................................... 382/162; 358/523

(58) Field of Classification Search ................ 382/162, 382/167; 358/523
See application file for complete search history.

(56) References Cited

U.S. PATENT DOCUMENTS

| 5,087,965 A | * | 2/1992 | Torre-Bueno | ............... 358/523 |
| 5,828,781 A | * | 10/1998 | Nakano | ...................... 382/167 |
| 6,654,494 B1 | | 11/2003 | Sawada | |

FOREIGN PATENT DOCUMENTS

| JP | 4-119373 A | 4/1992 |
| JP | 11-46307 A | 2/1999 |
| JP | 2000-048179 A | 2/2000 |
| JP | 2000-50086 A | 2/2000 |
| JP | 2000-059638 A | 2/2000 |
| JP | 2002-101312 A | 4/2002 |
| JP | 2002-185804 A | 6/2002 |
| WO | WO 01/37210 A1 | 5/2001 |

OTHER PUBLICATIONS

U.S. Appl. No. 09/641,339, filed Aug. 18, 2000, Sawada et al.
Hiroaki Kotera et al., "Image-Dependent Gamut Compression and Extension," Society for Imaging Science and Technology, published in PICS 2001: Image Processing, Image Quality, Image Capture Systems Conference, Montreal, Quebec, Canada; May 22, 2001, pp. 288-292 as provided http://www.imaging.org/store/epub.cfm?abstrid=4639, (2 pgs.).

* cited by examiner

*Primary Examiner*—Duy M. Dang
(74) *Attorney, Agent, or Firm*—Foley & Lardner LLP (57) ABSTRACT

There is disclosed an image processing apparatus of the present invention in which a color region of a range including a color range that can be outputted by an image output device is mapped based on a predetermined mapping function defined between the color region and a color conversion table address space by an address map producing section, so that waste in a color conversion table is inhibited, the number of valid lattice points in the color conversion table increases, and therefore color conversion accuracy is improved.

17 Claims, 8 Drawing Sheets

FIG. 4 (Color conversion master database address space)

FIG. 5 (Color conversion master database address space)

METHOD AND APPARATUS FOR COLOR CONVERSION

CROSS-REFERENCE TO RELATED APPLICATIONS

This application is based upon and claims the benefit of priority from the prior Japanese Patent Application No. 2002-344317, filed Nov. 27, 2002, the entire contents of which are incorporated herein by reference.

BACKGROUND OF THE INVENTION

1. Field of the Invention

The present invention relates to an apparatus and method for color conversion which are used in an image output device capable of outputting a color image corresponding to an input color image with a high color accuracy.

2. Description of the Related Art

In recent years, with spread of network environments in offices, digital copy machines have changed to multifunction peripherals (MFP) which are connected to network and which are usable not only as the copy machines but also as printers, scanners, and FAX. Especially, a specific gravity has increased in an application as the printer. Accordingly, in full-color digital multifunction peripherals (hereinafter referred to as the color MFP), not only a viewpoint for copy indicating that colors of drafts are faithfully reproduced but also performance of printer color reproduction indicating that the colors displayed in displays such as a monitor device are favorably outputted are regarded as important.

In general, as compared with a color reproduction range that can be displayed in the monitor device, a printer color reproduction range that can be outputted by the color MFP is small, and therefore colors outside a printer color range cannot be matched. Therefore, with respect to the monitor display colors outside the printer color range, a method of mapping the colors in appropriate colors in the printer color range has broadly been used.

In this case, a policy of the color reproduction is considered to be appropriate as "there is not any sense of incongruity from monitor display, and the reproduced color is clear and easy to see even when seen alone".

During the mapping, to transform the color by a table referring system, a method is used in which image data itself of a color conversion object is used as a read address of a color conversion table to read a color conversion result or a reference value for interpolating the color conversion result from the color conversion table.

Moreover, for a usual flow in using the color MFP to print/output an RGB image file, RGB is transformed into L*a*b* or CIEXYZ (called a profile connection space (PCS)) which is a device independent color space, and further transformed into CMYK. This is two stages of conversion. In the color conversion, each ICC profile is used as information indicating identity of RGB and CMYK.

For example, an example in which an RGB image inputted from a scanner is transformed into a CMY image for a printer output will be described with reference to FIG. 16.

Figure 16:
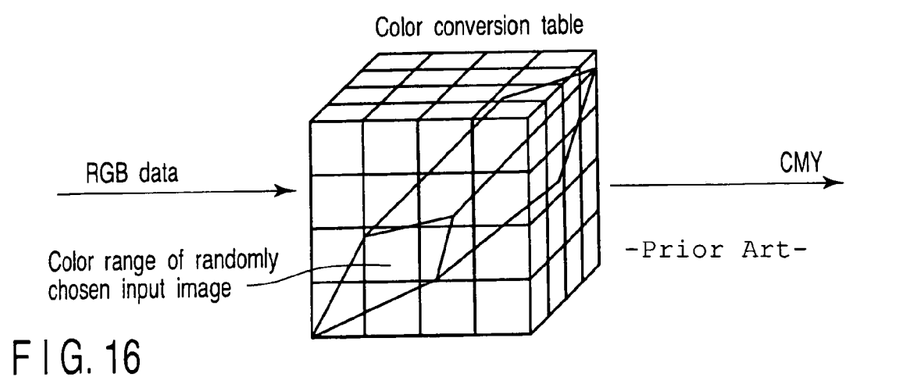
FIG. 16 is a schematic diagram showing the concept of sizes (maps) of the color space of the mapping element in a known color conversion apparatus and a color space of the color conversion table.

In FIG. 16, a painted-over portion in the color conversion-table indicates a region surrounded so as to include all colors appearing in a certain image, and a non-painted-over portion indicates a region which does not appear in the image, that is, which is out of the object of the color conversion.

The RGB image inputted from the scanner includes the color which appears and the color which does not appear in accordance with a scene content. Therefore, in many cases, even when the color region is surrounded so as to include all the colors appearing in a certain image (scene), all RGB spaces that are color spaces before the conversion are not included. In many cases, a region outside the color conversion object is rather large, although the region is in the RGB space.

For the accuracy of the color conversion by the table referring system, it is more satisfactory to use a table in which table entries (the number of lattice points inputted in the table) are denser, that is, a large number of table lattice points exist at short intervals.

It is to be noted that in "Image-Dependent Gamut Compression and Extension, Hiroaki Kotera et al., pages 288 to 292, PIC2002 proceeding (Imaging Science and Technology)", a color conversion method has already been proposed in which gamut mapping is used to extend or compress a range of colors possessed by the input image, and the range is fully matched with a color range that can be outputted by an output device.

As described above, when the valid number of lattice points is limited only inside the region painted over in FIG. 16, the lattice points in the region that is not painted over are wasted. That is, as shown in FIG. 16, the number of table entries for use in the color conversion (this will be referred to as the valid lattice point number) is limited only inside the painted-over region. Moreover, the region painted over in FIG. 16 corresponds to a table in which the valid lattice point number is substantially coarse. Therefore, there is a problem that a memory for use in the table is wasted, whereas the color conversion accuracy drops.

On the other hand, in a color conversion flow in which the ICC profile is used, the following three problems are caused.

For example, in a stage in which a PCS value is transformed into a CMYK value, information indicating the PCS values corresponding to primary colors RGB is lost. Therefore, a process limited to the primary colors RGB becomes difficult.

Moreover, even if the PCS values corresponding to the primary colors RGB are known, in general, the PCS values are not put on a straight line connecting the lattice points of the color conversion table in a CMYK profile. Therefore, the CMYK value corresponding to the PCS value has to be obtained by table interpolation with the lattice points of another hue. There is a problem that the hue is distorted by an interpolation error.

Furthermore, when several types of RGB color spaces have to be handled as the color spaces of the input image, the PCS value corresponding to the primary color differs with each type of the RGB color space. Therefore, there is a problem that a plurality of CMYK profiles have to be prepared.

BRIEF SUMMARY OF THE INVENTION

An object of the present invention is to provide an apparatus and method for color conversion in which color conversion with a high conversion accuracy is possible in accordance with colors that can be outputted by a color image output device.

According to an aspect of the present invention, there is provided a color conversion method comprising:

calculating a range of color distribution of inputted image data to obtain a result as a color range parameter;

producing a mapping function to map a color range including the color distribution range represented by the obtained color range parameter in a first color space and conversing the inputted image data by the mapping function, producing a first writing address to write the inputted image data converted by the mapping function into a color conversion table, producing a second writing address which is an inverse function of the first writing address;

reading setting data into the color-conversion table from a color conversion master database by using of the second writing address;

reading a second color space from the color conversion table by using a high-order bit of the first writing address and the setting data; and converting color referring to second color space data and further interpolating the data to transform color, when the corresponding data does not exist.

According to another aspect of the present invention, there is provided a color conversion apparatus comprising:

an input image color range extracting section which calculates a color distribution range of inputted image data to output the result as a color range parameter;

an address map producing section which produces a mapping function to map a color range represented by a first color space including the color distribution range represented by the color range parameter in accordance with a predetermined mapping function;

an address map calculating section which converts the inputted image data in accordance with the mapping function;

a color conversion table address producing section which produces a write address into a color conversion table;

an address inverse map calculating section to inversely map/convert the write address into the color conversion table in accordance with an inverse mapping function which is an inverse function of the mapping function produced by the address map producing section;

a color conversion master database from which setting data is read using an inverse map result of the color conversion table write address supplied from the address inverse map calculating section as a read address;

a color conversion table in which the setting data read and supplied from the color conversion master database is written beforehand with respect to the color conversion table write address and from which second color space data is read using a high-order bit of an address map calculation result supplied from the address map calculating section as the read address; and a color conversion section which refers to the second color space data read from the color conversion table and which interpolates the data to output a result.

According to still another aspect of the present invention, there is provided a color conversion apparatus comprising:

input image color range extracting means for calculating a color distribution range of inputted image data to output the result as a color range parameter;

address map producing means for producing a mapping function to subjectively map a color range including the color distribution range represented by the color range parameter in a first color space;

address map calculating means for converting the inputted image data in accordance with the mapping function;

color conversion table address producing means for producing a write address into a color conversion table;

address inverse map calculating means for inversely mapping/converting the write address into the color conversion table in accordance with an inverse mapping function which is an inverse function of the mapping function produced by the address map producing means;

a color conversion master database from which data is read using an inverse map result of the color conversion table write address supplied from the address inverse map calculating means as a read address;

a color conversion table in which the data read and supplied from the color conversion master database is written beforehand with respect to the color conversion table write address and from which second color space data is read using a high-order bit of an address map calculation result supplied from the address map calculating means as the read address; and color conversion means for referring to the second color space data read from the color conversion table and interpolating the data to output a result.

According to another aspect of the present invention, there is provided a color conversion method comprising:

converting inputted lattice point RGB data into intermediate data in a predetermined color space based on an ICC profile of RGB;

converting the intermediate data into second intermediate data based on the ICC profile of CMYK;

correcting/processing the second intermediate data to prepare a color conversion table; and referring to color space data read from the prepared color conversion table to directly color-transform the RGB data which is a color conversion object into CMYK data.

According to still another aspect of the present invention, there is provided a color conversion apparatus comprising:

a first color conversion section which converts inputted lattice point RGB data into intermediate data in a predetermined color space based on an ICC profile;

a second color conversion section which converts the intermediate data converted by the first color conversion section into second intermediate data based on the ICC profile;

a correcting/processing section which corrects the second intermediate data produced by the second color conversion section;

a color conversion table in which a corrected value corrected by the correcting/processing section is held; and a direct color conversion section which refers to color space data read from the color conversion table to convert RGB data which is a color conversion object into CMYK data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will hereinafter be described in detail with reference to the drawings.

Figure 1:
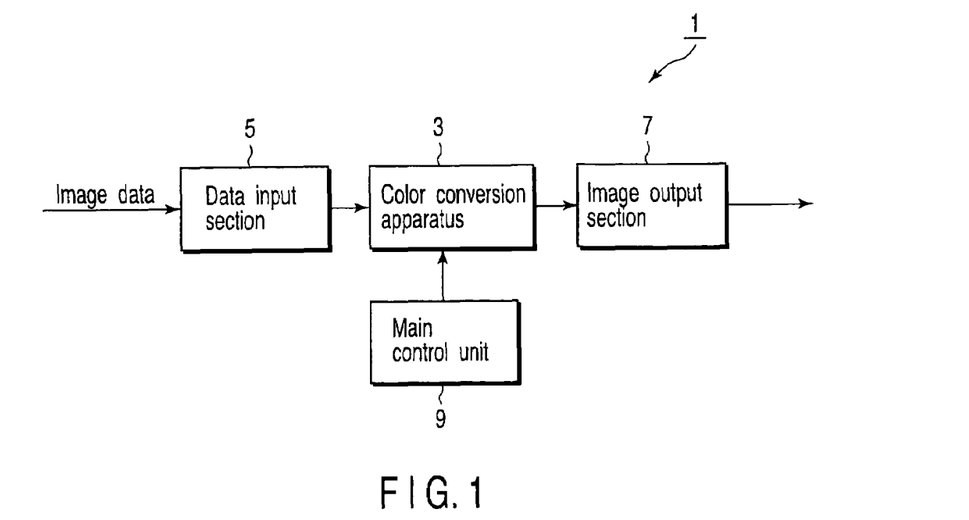
FIG. 1 is a schematic diagram showing a major part of a color image processing apparatus including a color conversion apparatus of the present invention.

FIG. 1 is a schematic diagram showing a major part of a color image processing apparatus including a color conversion apparatus of the present invention.

As shown in FIG. 1, a color image processing apparatus 1 is constituted of a color conversion apparatus 3, a data input section 5 which inputs image data to the color conversion apparatus 3, and an image data output section 7 which outputs a color conversion output outputted from the color conversion apparatus 3 to an image output device. It is to be noted that the color conversion apparatus 3, data input section 5, and image data output section 7 are controlled by a main control unit 9.

In the color image processing apparatus 1 shown in FIG. 1, the image data supplied from the outside or the image data held in an image memory is inputted into the color conversion apparatus 3 from the data input section 5. It is to be noted that the image data inputted into the color conversion apparatus 3 is RGB (R denotes red, G denotes green, and B denotes blue) color coordinate data of an additive color mixing system.

In the color conversion apparatus 3, as described later with reference to FIGS. 2 to 15, for each pixel of the inputted image data, the RGB (additive color mixing system) color coordinate data is color-transformed (mapped into a different color space) into CMY (C denotes cyan, M denotes magenta, and Y denotes yellow) color coordinate data of a subtractive color mixing system (or CMYBk color coordinate data including a single black image and Bk, that is, black for black emphasis). That is, the inputted RGB data is converted to CMY data reproduced in a color range that can be outputted in an output system.

A color conversion output color-transformed by the color conversion apparatus 3 is outputted to output devices such as a laser beam printer and an ink jet printer from the image data output section 7, and outputted (printed out) in output mediums such as paper and resin film.

The color conversion apparatus 3 will hereinafter be described with reference to FIGS. 2 to 15. The apparatus includes characteristics of the present invention, and can be carried out by various embodiments.

The data input section 5 is an input interface via which the image data supplied from image read devices such as a scanner and digital camera (hereinafter abbreviated to as DSC) or image data having a predetermined format can be inputted.

The image data output section 7 outputs color conversion output data to the laser beam printer using, for example, toner as a color material, for example, via a predetermined communication protocol or interface.

Figure 2:
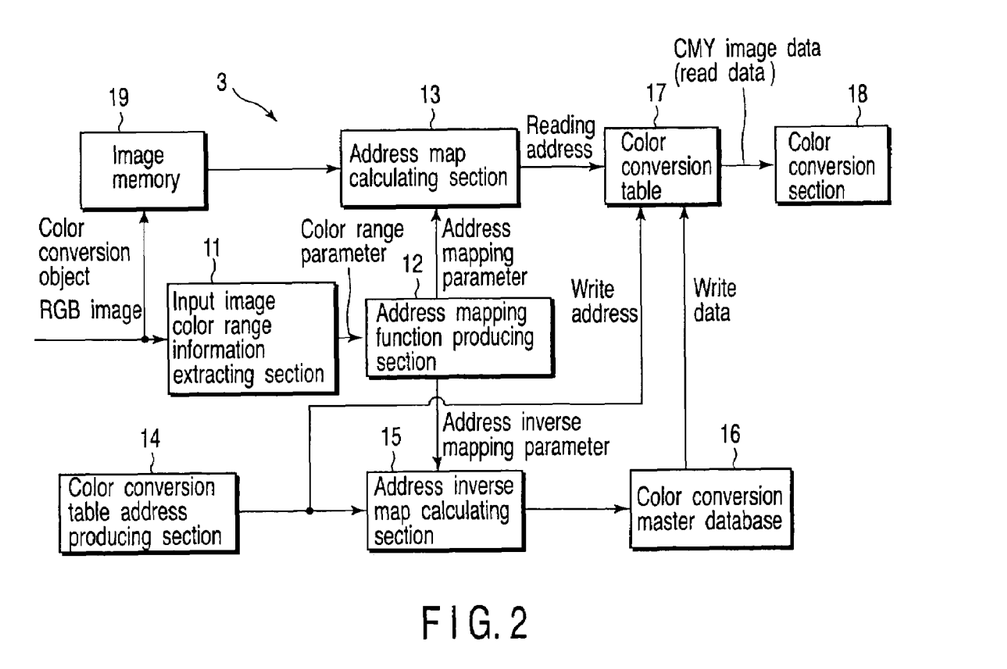
FIG. 2 is a schematic block diagram showing one example of the color conversion apparatus incorporated in the color image processing apparatus shown in FIG. 1.

For example, as shown in FIG. 2, the color conversion apparatus 3 includes an input image color range information extracting section 11, address mapping function producing section 12, address map calculating section 13, color conversion table address producing section 14, address inverse map calculating section 15, color conversion master database 16, color conversion table 17, color conversion section 18, and image memory 19.

The input image color range information extracting section 11 calculates a color distribution range of the image data inputted from the outside to output the calculation result as a color range parameter to the address mapping function producing section 12.

The address mapping function producing section 12 produces a mapping function (i.e., an address mapping parameter) for mapping a color range represented by a first color space including the color distribution range represented by the color range parameter supplied from the input image color range information extracting section 11 in a region broader than the first color space.

The address map calculating section 13 outputs a read address for allowing the image data inputted from the outside or the image data inputted from the outside and stored in the image memory 19 to correspond to arbitrary lattice point data of the color conversion table 17 described later in accordance with the address mapping parameter (mapping function) produced in the address mapping function producing section 12.

The color conversion table address producing section 14 produces a write address (color conversion table address) to instruct the write of the setting data into the color conversion table 17. It is to be noted that the color conversion table address produced by the color conversion table address producing section 14 is also supplied to the address inverse map calculating section 15 described later.

The address inverse map calculating section 15 subjects the write address for instructing the write into the color conversion table 17 (color conversion table address produced by the color conversion table address producing section 14) to inverse mapping conversion in accordance with an inverse mapping function (address mapping parameter) which is an inverse function of the mapping function produced by the address mapping function producing section 12.

The color conversion master database 16 is a large-capacity color conversion table (high-accuracy color conversion database) including a very dense lattice point distribution which includes lattice points more than those included in the color conversion table 17 described later. That is, in the color conversion master database 16, a correspondence table of data before/after conversion which is correct answer information of color conversion is stored. The lattice point data stored in the color conversion master database 16 is read using an inverse mapping result of the write address into the color conversion table 17 produced by the address inverse map calculating section 15 as the read address.

The color conversion table 17 is a database (table) in which second color space data read and supplied from the color conversion master database 16 is written beforehand with respect to the color conversion table address supplied from the color conversion table address producing section 14. Moreover, the second color space data in the color conversion table 17 is read using a high-order bit of an address map calculation result produced by the address map calculating section 13 as the read address.

Figure 3:
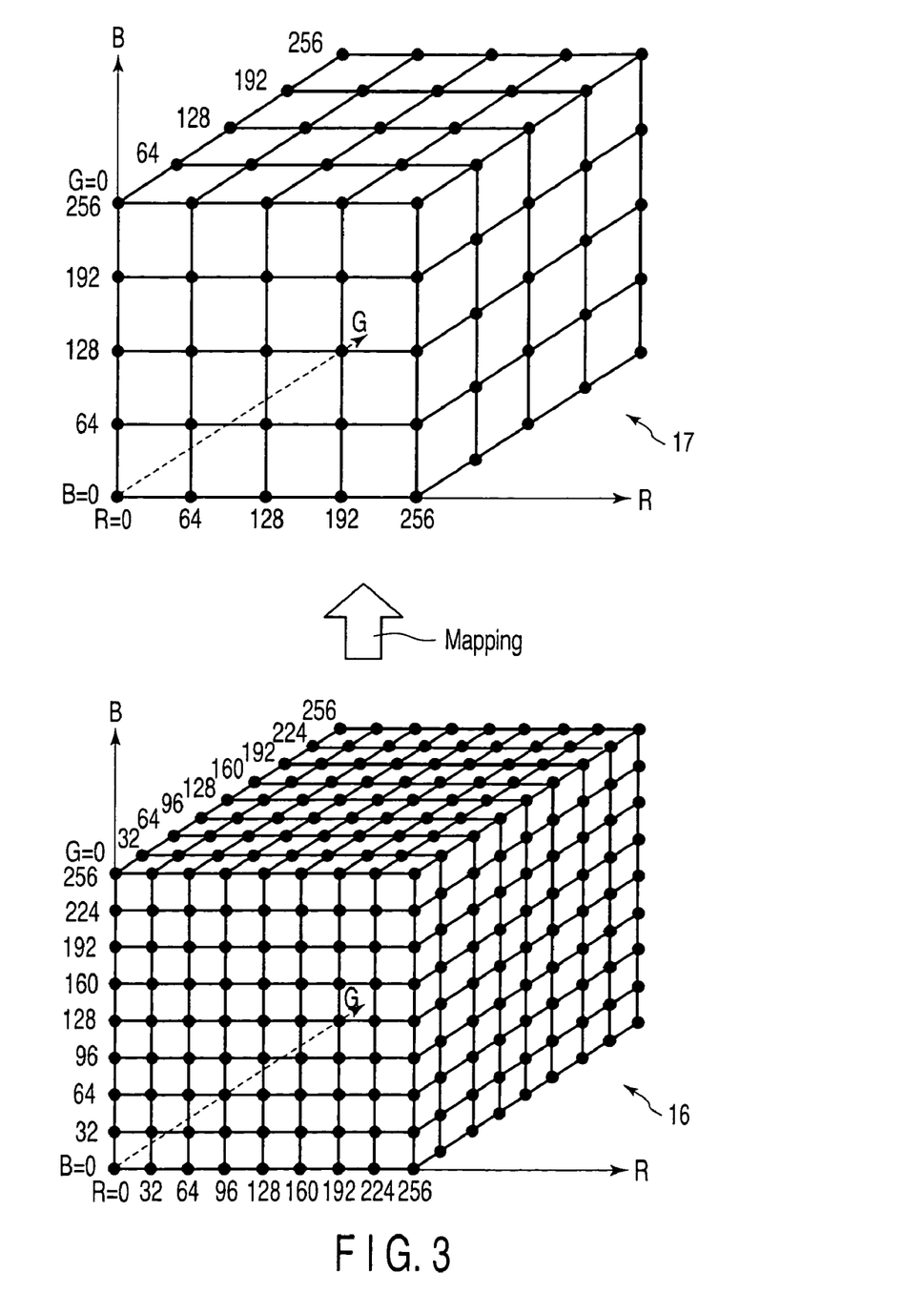
FIG. 3 is a schematic diagram showing a relation between an address space of lattice points held by a color conversion master database in the color conversion apparatus shown in FIG. 2 and an address space of a color conversion table (the color conversion master database is equal to the color conversion table in a defined range of the address space, and is different from the table in coarse/dense lattice points)

It is to be noted that the address space of the color conversion table 17 and the address space of the lattice point which is an entry into the color conversion master database 16 are common defined ranges as shown in FIG. 3. Each of the respective spaces is, for example, a three-dimensional color space of eight bits of RGB.

The color conversion section 18 refers to the second color space data read from the color conversion table 17, and interpolates the data in a case where the corresponding data does not exist to output the color conversion output to the image data output section 7.

Next, one example of the color conversion in the color conversion apparatus shown in FIG. 2 will be described in detail.

First, a content of the color conversion master database 16 is set. A value to be stored in the color conversion master database 16 is acquired in a method similar to a known color characterization method performed with respect to color image apparatuses such as the scanner and printer. In this case, when as many color patches as possible are inputted/outputted and measured, a more accurate correspondence of the color conversion can be acquired.

The RGB image data read via image readers (not shown) such as the scanner is stored in the image memory 19 and inputted into the input image color range information extracting section 11.

Figure 4:
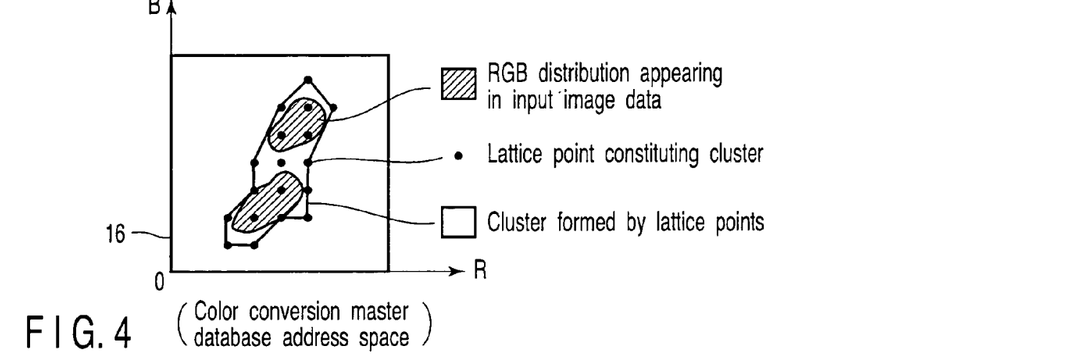
FIG. 4 is a schematic diagram showing a concept of a color range parameter (cluster) defined from image data inputted into the color conversion apparatus shown in FIG. 2 in an input image color range information extracting section (state of a hexahedron seen from a front surface direction)

As shown in FIG. 4, considering a region which includes all RGB coordinate points included in the input RGB image data and which has a minimum volume constituted of lattice point group in the color conversion master database 16 and which is called a cluster, the input image color range information extracting section 11 supplies information specifying the lattice point group constituting the cluster as the color range parameter to the address mapping function producing section 12.

Figure 5:
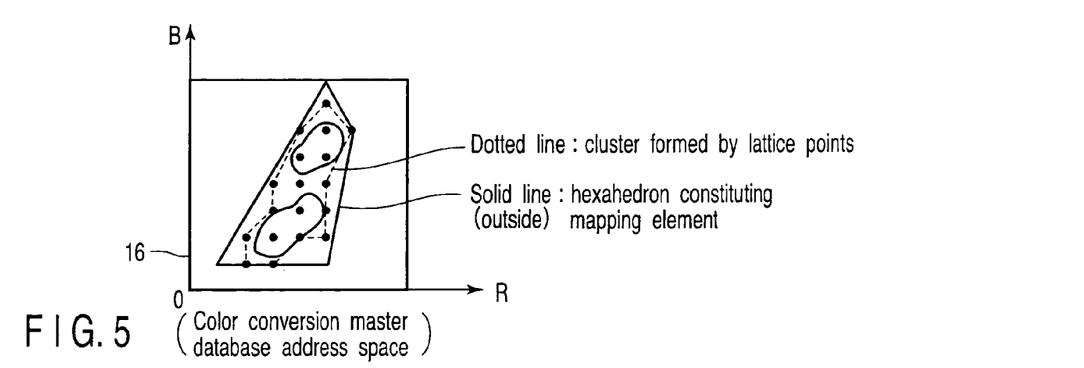
FIG. 5 is a schematic diagram showing the concept of a color space which is a mapping element defined in an address mapping function producing section of the color conversion apparatus shown in FIG. 2 (state of the hexahedron seen from the front surface direction)
Figure 6:
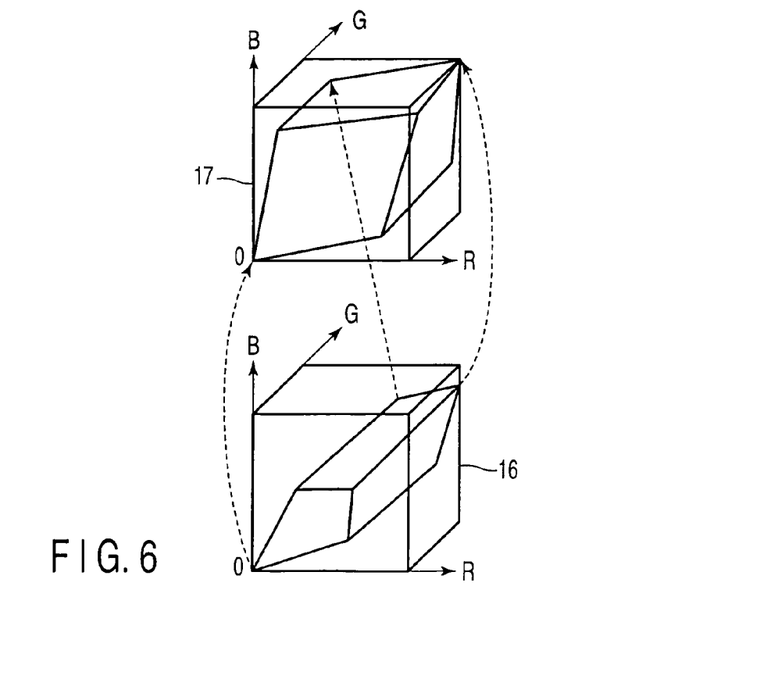
FIG. 6 is a schematic diagram showing the concept of the mapping of the color space which is the mapping element shown in FIG. 5 in a region (hexahedron) having a larger volume.

The address mapping function producing section 12 defines a hexahedron which includes the cluster defined as shown in FIG. 4 and which has a volume as small as possible (described in a plane because depth is not considered in FIG. 5) as shown in FIG. 5, produces a function for mapping the hexahedron in a region including the hexahedron and having a volume larger than that of the hexahedron as shown in FIG. 6, and supplies parameters required for executing the function as the address mapping parameters to the address map calculating section 13. The address mapping function producing section 12 also supplies the parameters required for executing an inverse function of this mapping function as address inverse mapping parameters to the address inverse map calculating section 15.

Next, the content of the color conversion table 17 is set. It is to be noted that the color conversion table 17 is set after inputting the image constituting an object, because the setting differs with each image.

First, the color conversion table address producing section 14 produces an address for writing the setting data into the color conversion table 17. The write address produced by the color conversion table address producing section 14 is supplied to the color conversion table 17 and address inverse map calculating section 15. That is, in the address inverse map calculating section 15, in accordance with the address inverse mapping parameter, the address for writing the setting data into the color conversion table 17 is inversely mapped.

The result of the inverse mapping by the address inverse map calculating section 15 is outputted as a lattice point address of the data (second color space data) read as the data to be written into the color conversion table 17 from the color conversion master database 16.

The data (second color space data) read from the color conversion master database 16 in accordance with the address supplied from the address inverse map calculating section 15 is written as (second) setting data of the color conversion table 17 into the color conversion table 17 in accordance with the address produced by the color conversion table address producing section 14.

This process including the production of the color conversion table address to the write of the setting data into the color conversion table is repeated for all the lattice points of the color conversion table 17. Accordingly, all preparations for the color conversion are ended.

Next, the inputted RGB image is color-transformed.

Since the RGB image data to be color-transformed is already stored in the image memory 19, the data is read from the image memory 19 every pixel to execute the color conversion.

First, RGB pixel data read from the image memory 19 is supplied to the address map calculating section 13.

The address map calculating section 13 maps the RGB pixel data in accordance with the address mapping parameter supplied from the address mapping function producing section 12, and supplies the result to the color conversion section 18.

The color conversion section 18 uses the mapping result of the RGB pixel data by the address map calculating section 13 as a reference address of the color conversion table 17 and refers to the color conversion table 17 to obtain the data, interpolates the data in a case where the corresponding data does not exist, and performs interpolating calculation based on the data to calculate CMY color conversion result.

As described above, the color conversion apparatus of the present invention includes: the input image color range information extracting section 11 for calculating the color distribution range of the inputted image data to output the result as the color range parameter; the address mapping function producing section 12 for producing the mapping function to map the color range represented by the first color space including the color distribution range represented by the color range parameter in a region broader than the first color space; the address map calculating section 13 for converting the inputted image data in accordance with the mapping function; the color conversion table address producing section 14 for producing the write address into the color conversion table; the address inverse map calculating section 15 for inversely mapping/converting the write address into the color conversion table in accordance with the inverse mapping function which is the inverse function of the mapping function produced by the address mapping function producing section 12; the color conversion master database 16 from which the setting data is read using the inverse mapping result of the color conversion table write address supplied from the address inverse map calculating section as the read address; the color conversion table 17 in which the setting data read and supplied from the color conversion master database is written beforehand with respect to the color conversion table write address and from which the second color space data is read using the high-order bit of the address map calculation result supplied from the address map calculating section as the read address; and the color conversion section 18 for referring to the second color space data read from the color conversion table and interpolating the data to output the result. Therefore, for the color range of the input image, the color region of the range including the color range is mapped to be broader in the color conversion table address space. Therefore, waste of the color conversion table lattice points is reduced. Conversely, the valid number of lattice points of the color conversion table increases, and color conversion accuracy is improved. Moreover, since it is possible to allocate the optimum valid number of lattice points to each inputted image, the color conversion accuracy for each image is improved.

It is to be noted that in the color conversion apparatus shown in FIG. 2, the image memory 19 can also be omitted.

In this case, the image data inputted into the input image color range information extracting section 11 is not stored. Therefore, the color range parameter is produced from an arbitrary input object based on first image data inputted into the input image color range information extracting section 11, and the same input information may be inputted into the input image color range information extracting section 11 again to perform the color conversion.

For example, when image information of a draft is inputted by the scanner, the first image data is acquired by pre-scanning, the color range parameter is produced based on the pre-scanned image, and thereafter the color conversion may be executed with respect to the image data obtained by really scanning the same draft.

Figure 7:
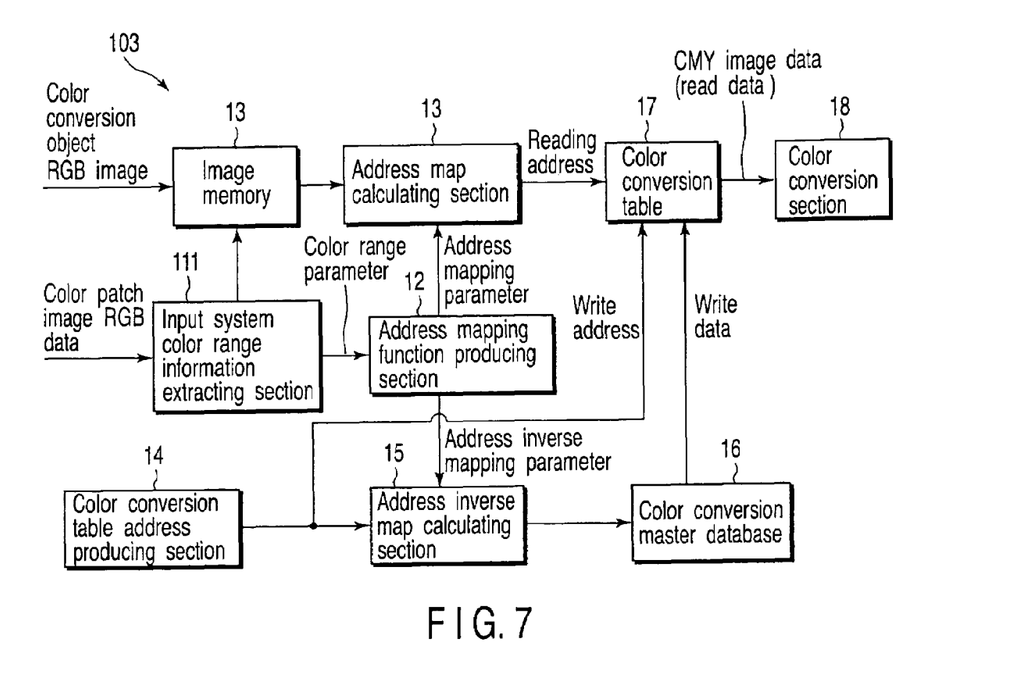
FIG. 7 is a schematic block diagram showing another example of the color conversion apparatus shown in FIG. 2.

FIG. 7 is a schematic diagram showing another embodiment of the color conversion apparatus described above with reference to FIG. 2. It is to be noted that the same elements as those already described with reference to FIG. 2 are denoted with the same reference numeral and detailed description thereof is omitted. Since the elements other than the color conversion apparatus are the same as those in the color image processing apparatus shown in FIG. 1, the description is omitted.

As shown in FIG. 7, a color conversion apparatus 103 includes an input system color range information extracting section 111, the address mapping function producing section 12, the address map calculating section 13, the color conversion table address producing section 14, the address inverse map calculating section 15, the color conversion master database 16, the color conversion table 17, the color conversion section 18, and the image-memory 19.

The input system color range information extracting section 111 calculates an input table color range inherent in input systems for inputting the image data with respect to the data input section 5 such as an input device, medium, and display format (media), that is, states (characteristics) of a subject or input environments (characteristics of a light source) to output the calculation result as the color range parameter to the address mapping function producing section 12.

That is, the image data supplied to the input system color range information extracting section 111 via the data input section 5 indicates various conditions such as whether the input device is the scanner or the digital camera, whether the medium is a film (transmission type), photograph, or printed matter (reflective type), whether the display format is negative or positive, whether the input environment is outdoor (under sunlight) or indoor (under artificial lighting), and the type of the light source under the artificial lighting. Accordingly, when the color conversion table is set, correspondence to inherent conditions determined by each of the various conditions or an arbitrary combination of the conditions is required. It is to be noted that since the setting of the content of the color conversion master database 16 in the color conversion apparatus and the operation of the color conversion (steps of the color conversion) are the same as those of the color conversion apparatus described with reference to FIG. 2, the description is omitted here.

To prepare the color conversion table, although not shown, color charts whose specifications are predetermined (color target charts) such as easily obtainable charts defined, for example, by Japanese Industrial Standards (JISZ2300 and Z8721), IT8, and SCID are first inputted as input objects into the input system color range information extracting section 111 under the predetermined conditions.

That is, the image data of the prepared color target chart is inputted into the input system color range information extracting section 111.

The input system color range information extracting section 111 obtains RGB values of individual color patches of a color target image. Examples of the method include a method of sampling a plurality of pixels for each color patch to obtain an average of values of the plurality of sampled pixels.

Figure 8:
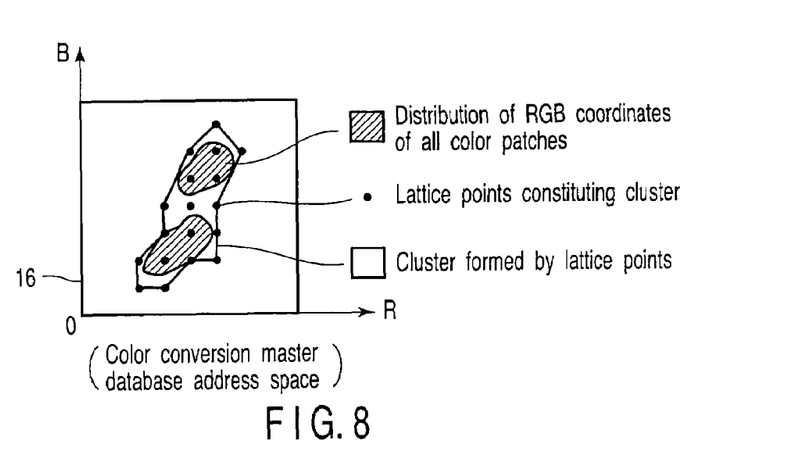
FIG. 8 is a schematic diagram showing the concept of the color range parameter (cluster) defined in an input system color range information extracting section in a case where the image data inputted into the color conversion apparatus shown in FIG. 7 includes an input table color range inherent in an image data input system (state of the hexahedron seen from the front surface direction)

As shown in FIG. 8, considering the region which includes all the RGB coordinate points of all the color patches and which has the minimum volume constituted of the lattice point group in the color conversion master database 16 and which is called the cluster, the input system color range information extracting section 111 supplies the information specifying the lattice point group constituting the cluster as the color range parameter to the address mapping function producing section 12.

Then, the address mapping function producing section 12 defines the hexahedron which includes the cluster and which has the volume as small as possible in the same manner as described above with reference to FIG. 5, and produces the function for mapping the hexahedron in the region including the hexahedron and having the volume larger than that of the hexahedron in the same manner as described above with reference to FIG. 6. Next, the section supplies the parameters required for executing the function as the address mapping parameters to the address map calculating section 13. The parameters required for executing the inverse function of this mapping function are also supplied as the address inverse mapping parameters to the address inverse map calculating section 15.

Next, the content of the color conversion table 17 is set. It is to be noted that since the content of the color conversion table 17 does not depend on the input image, the setting of the color conversion table 17 is performed before inputting the image, different from the setting of the color conversion table in the color conversion apparatus shown in FIG. 2.

First, the color conversion table address producing section 14 produces the address for writing the setting data into the color conversion table 17.

This write address is inversely mapped in accordance with the address inverse mapping parameter in the address inverse map calculating section 15.

The result of the inverse mapping in the address inverse map calculating section 15 is outputted as the lattice point address of the data read as the data to be written into the color conversion table 17 from the color conversion master database 16.

The data read from the color conversion master database 16 in accordance with the address supplied from the address inverse map calculating section 15 is written as the setting data of the color conversion table 17 into the color conversion table 17 in accordance with the address produced by the color conversion table address producing section 14.

This process including the production of the color conversion table address to the write of the setting data into the color conversion table is repeated for all the lattice points of the color conversion table. Accordingly, all the preparations for the color conversion are ended.

The operation of the color conversion will hereinafter be described.

The inputted RGB pixel data to be color-transformed is supplied to the address map calculating section 13.

The address map calculating section 13 maps the RGB pixel data in accordance with the address mapping parameter supplied from the address mapping function producing section 12, and supplies the result to the color conversion section 18.

The color conversion section 18 uses the mapping result of the RGB pixel data by the address map calculating section 13 as the reference address of the color conversion table 17, refers to the color conversion table 17, interpolates the data in the case where the corresponding data does not exist, and performs the interpolating calculation based on the data to calculate the CMY color conversion result.

In this manner, the color conversion apparatus of the present invention includes: the input system color range information extracting section 111 for calculating the input table color range inherent in the image data input system to output the result as the color range parameter; the address mapping function producing section 12 for producing the mapping function to map the color range represented by the first color space including the input color range represented by the color range parameter in the region broader than the first color space; the address map calculating section 13 for converting the processing object image data in accordance with the mapping function; the color conversion table address producing section 14 for producing the write address into the color conversion table; the address inverse map calculating section 15 for inversely mapping/converting the write address into the color conversion table in accordance with the inverse mapping function which is the inverse function of the mapping function produced by the address mapping function producing section; the color conversion master database 16 from which the setting data is read using the inverse mapping result of the color conversion table write address supplied from the address inverse map calculating section as the read address; the color conversion table 17 in which the setting data read and supplied from the color conversion master database is written beforehand with respect to the color conversion table write address and from which the second color space data is read using the high-order bit of the address map calculation result supplied from the address map calculating section as the read address; and the color conversion section 18 for referring to the second color space data read from the color conversion table and interpolating the data to output the result. Therefore, the region of the range including the color range is mapped to be broader in the color conversion table address space in accordance with the color ranges of the input device, media (subjects), and input environments (light source). Therefore, the waste of the color conversion table lattice points is reduced. Conversely, the valid number of lattice points of the color conversion table increases, and the color conversion accuracy is improved. It is to be noted that in this method, as compared with the example for performing the color conversion for each image as described above, the color conversion accuracy is low, but the color conversion accuracy with respect to all the images that can be inputted is uniformly improved. Moreover, in this method, in a stage in which the input system is determined, the address mapping function may be produced by one characterization, and an overhead in a stage in which the individual images are color-transformed is not required.

Next, a method of producing the address mapping function which can be applied to any color conversion apparatus described with reference to FIGS. 2 and 7 will be described. It is to be noted that since the constitution other than that of the address mapping function producing section is similar to that of the color conversion apparatus described above with reference to FIGS. 2 and 7, the description is omitted.

Figure 9:
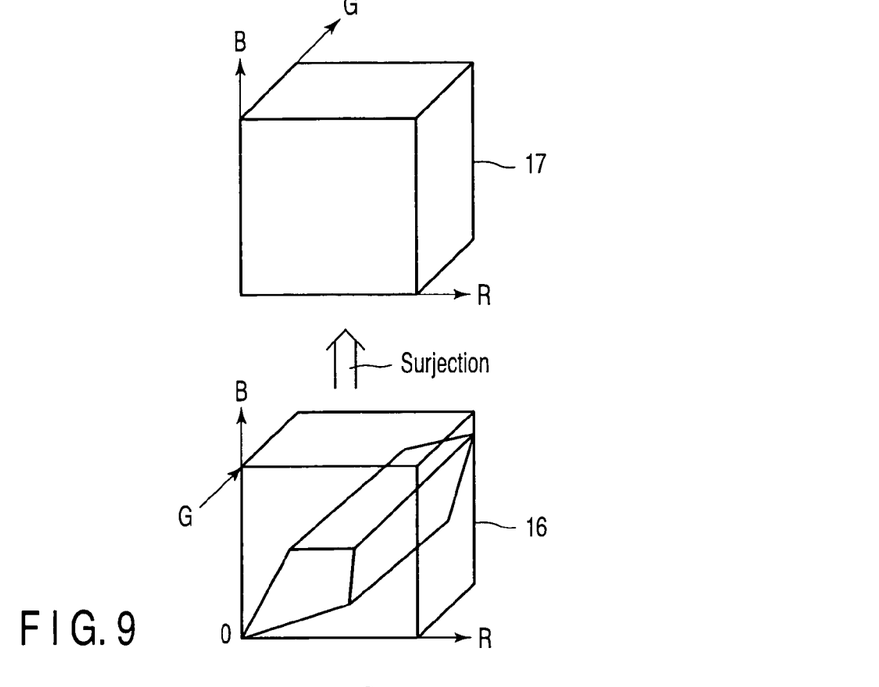
FIG. 9 is a schematic diagram showing the concept of subjection of the color space which is the mapping element shown in FIG. 4 or 8 in the region having a larger volume (hexahedron)

The following embodiment is characterized in that the cluster is defined in the color conversion master database 16 specified by the color range parameter supplied to the address mapping function producing section 12 shown in FIG. 2 or 7 (referred to as an address mapping function producing section 212 for the sake of convenience in this embodiment) from the input image color range information extracting section 11 (the color conversion apparatus 3 of FIG. 2) or the input system color range information extracting section 111 (the color conversion apparatus 103 of FIG. 7). As shown in FIG. 9, the hexahedron is defined so as to include the cluster and to have the volume as small as possible, and the function for mapping (subjectively mapping) the hexahedron in the whole color conversion table address space is produced.

Then, the address mapping function producing section 212 supplies the parameters required for executing the function for mapping the hexahedron including the cluster shown in FIG. 9 in the whole color conversion table address space as the address mapping parameters to the address map calculating section 13. Moreover, the parameters required for executing the inverse function of the mapping function are supplied as the address inverse mapping parameters to the address inverse map calculating section 15.

By this method, the color range including the color distribution range represented by a certain color range parameter which is a result of calculation of the color distribution range of the image data inputted by the input image color range extracting section is subjectively mapped in the color conversion table address space. Therefore, the waste of the color conversion table lattice points is reduced. Moreover, all the lattice points in the color conversion table (the number of lattice points inputted in the table) are valid. Therefore, the color conversion accuracy is improved at the maximum.

The address mapping function which can be applied to the respective color conversion apparatuses described above with reference to FIGS. 2 and 7 is also produced in still another embodiment described later. It is to be noted that since the constitution other than that of the address mapping function producing section is similar to that in the color conversion apparatuses described above with reference to FIGS. 2 and 7, the description is omitted.

Figure 10:
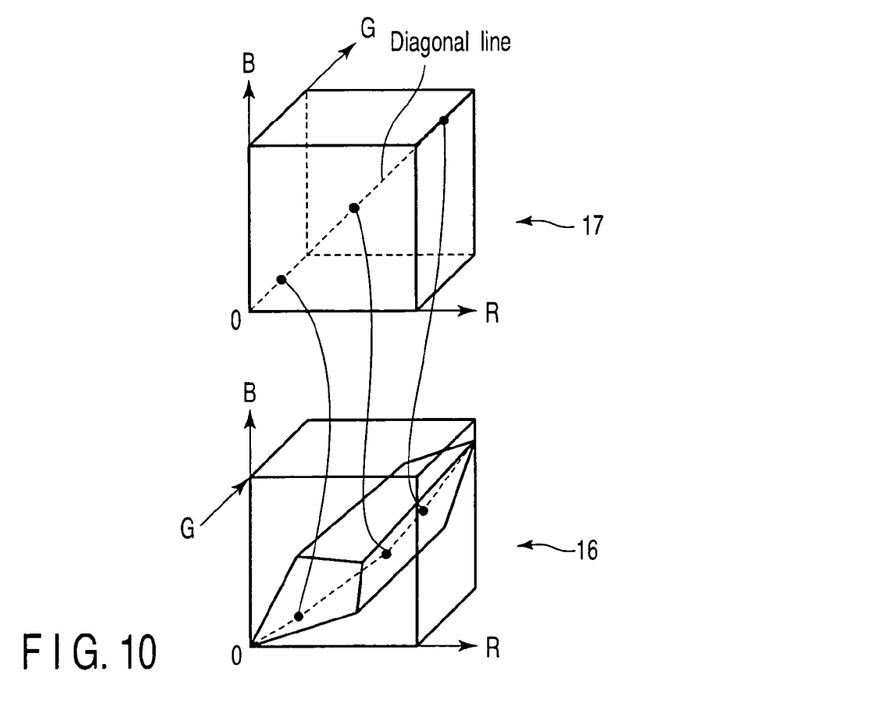
FIG. 10 is a schematic diagram showing the concept of the mapping of a gray point in the color space which is the mapping element shown in FIG. 4 or 8 in a gray axis of a color conversion table address space.

In the embodiment hereinafter described, for the address mapping function producing section 12 shown in FIG. 2 or 7 (referred to as an address mapping function producing section 312 for the sake of convenience in this embodiment), by the address mapping function, as shown in FIG. 10, a color coordinate value of a point (gray point) actually felt as gray by human color perception with respect to the input image is mapped on a gray axis of the color conversion table address space (a line indicating R=G=B, that is, a diagonal line of the color space indicated by the hexahedron in a case where the color conversion table address space is RGB). It is to be noted that information indicating the lattice point in the color conversion master database 16 that is the gray point is registered beforehand in the color conversion master database 16.

By this method, only the lattice point on the gray axis is referred to in table interpolation at the time of the color conversion of an arbitrary gray point, and therefore the lattice point of a chromatic color does not have to be referred to. That is, when it is assumed that table storage data of the gray point actually outputs gray in the output system, the color conversion result of the arbitrary gray point surely outputs gray, and the gray of the input image is sure to be reproduced as gray. That is, color reproducibility of the output image is reproduced in the color range as intended by a user.

The address mapping function which can be applied to the respective color conversion apparatuses described above with reference to FIGS. 2 and 7 is also produced in still another embodiment hereinafter described. It is to be noted that since the constitution other than that of the address mapping function producing section is similar to that in the color conversion apparatuses described above with reference to FIGS. 2 and 7, the description is omitted.

Figure 11:
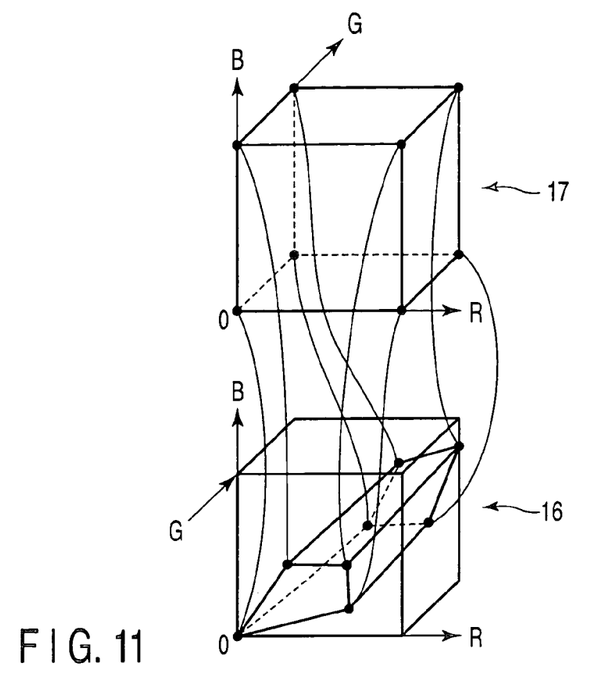
FIG. 11 is a schematic diagram showing the concept of the mapping of each vertex of the hexahedron indicating the color range parameter (cluster) of the mapping element shown in FIG. 4 or 8 in the corresponding vertex of the hexahedron having a larger volume.

In the embodiment hereinafter described, in the address mapping function producing section 12 shown in FIG. 2 or 7 (referred to as an address mapping function producing section 412 for the sake of convenience in this embodiment), for the address mapping function, as shown in FIG. 11, the mapping function for mapping a vertex of the color distribution range (hexahedron) represented by the color range parameter in the vertex of the first color space (hexahedron) is produced.

By this method, the address mapping function maps the color coordinate value of the vertex of the input system color range in the vertex of the color conversion table address space. Therefore, when the color of the vertex is transformed, the table interpolation is not required. In the color conversion result of the input image, the table storage data of the vertex is correctly outputted without being distorted. Therefore, white and black and color having a maximum chroma in a basic hue are outputted as a desired color conversion result as defined in the color conversion master database. That is, the color reproducibility of the output image is reproduced in the color range intended by the user.

The address mapping function which can also be applied to the respective color conversion apparatuses described with reference to FIGS. 2 and 7 is also produced in still another embodiment hereinafter described. It is to be noted that since the constitution other than that of the address mapping function producing section is similar to that in the color conversion apparatuses described above with reference to FIGS. 2 and 7, the description is omitted.

Figure 12:
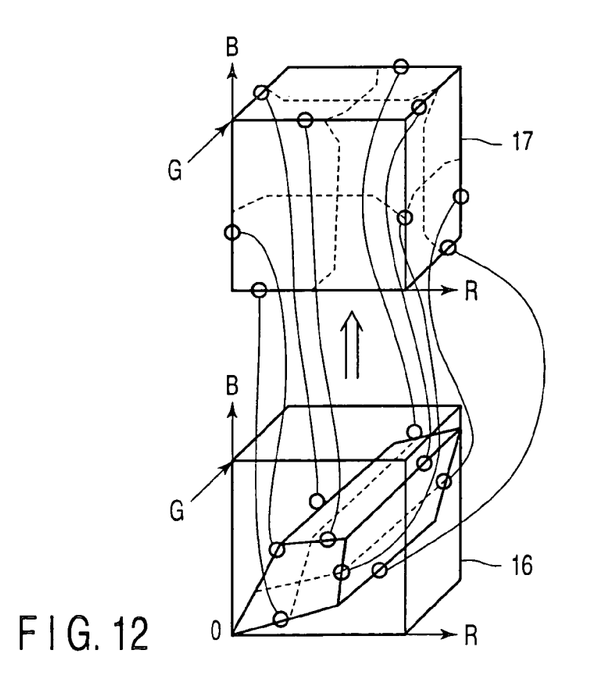
FIG. 12 is a schematic diagram showing the concept of the mapping of individual edge lines (sides of an outermost boundary) of the hexahedron showing the color range parameter (cluster) of the mapping element shown in FIG. 4 or 8 in the sides of the outermost boundary of the color conversion table address space.

In the embodiment hereinafter described, in the address mapping function producing section 12 shown in FIG. 2 or 7 (referred to as an address mapping function producing section 512 for the sake of convenience in this embodiment), for the address mapping function, as shown in FIG. 12, the mapping function for mapping a point on an edge line including the vertex of the color distribution range (hexahedron) represented by the color range parameter in a side of an outermost boundary of the color distribution range (hexahedron) indicating the color range parameter of the first color space is produced.

By this method, the address mapping function maps the color coordinate value on the edge line of the input system color range on the side of the outermost boundary of the color conversion table address space. Therefore, when the arbitrary color on the edge line is transformed, in the table interpolation, only the lattice point on the side of the outermost boundary is referred to, and therefore the conversion is not influenced by the color indicated by another lattice point. Therefore, when it is assumed that the data on the side of the outermost boundary (i.e., on the input system color range edge line) outputs uniform hue in the output system, in the color conversion result of the input image, the distortion of the basic hue can be inhibited. That is, the color reproducibility of the output image is reproduced in the color range intended by the user.

Next, still another embodiment of the color conversion apparatus of the present invention will be described with reference to FIG. 13. It is to be noted that here the respective elements are described in comparison with the respective elements of the color conversion apparatus described above with reference to FIGS. 2 and 7.

Figure 13:
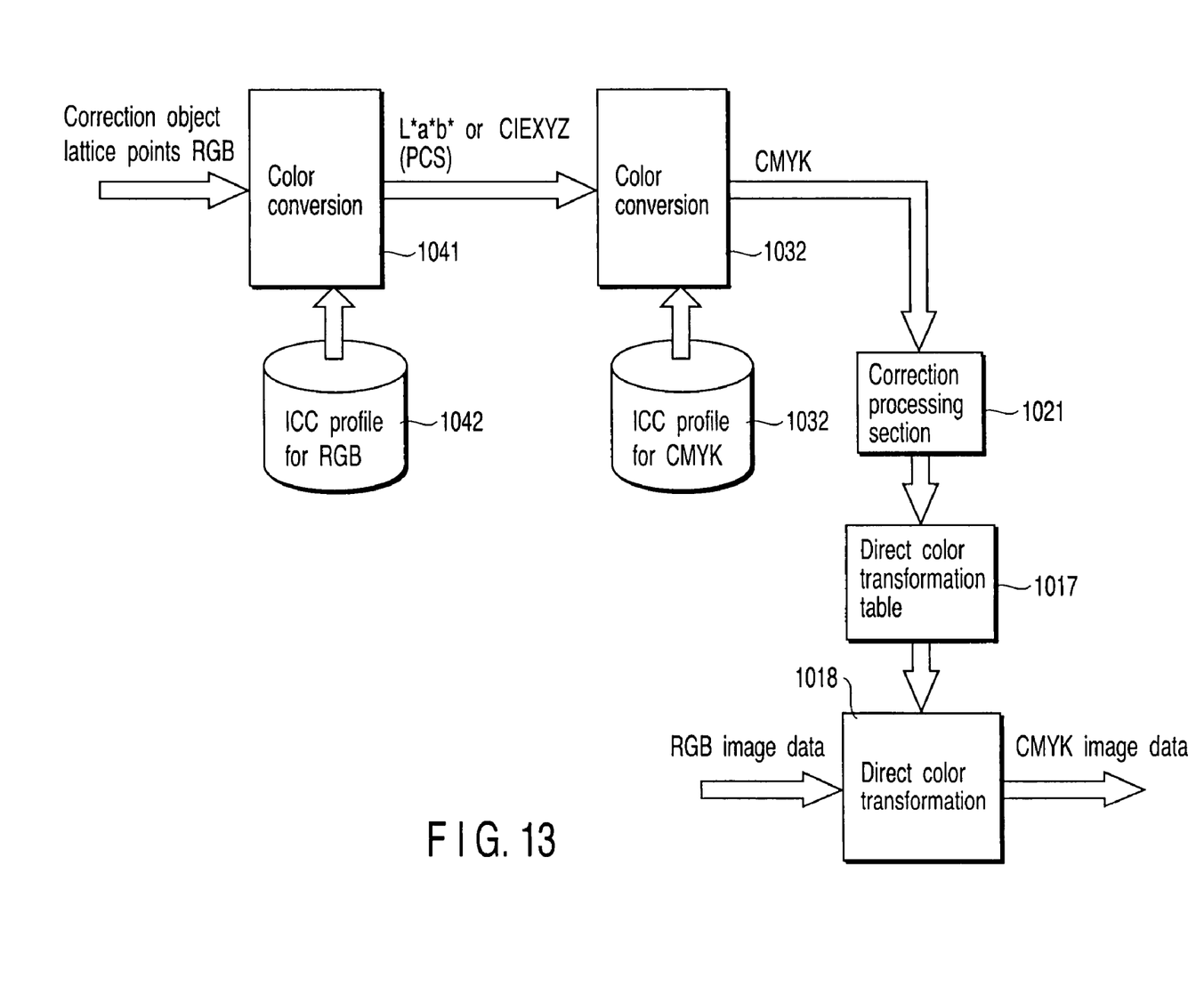
FIG. 13 is a schematic diagram showing still another embodiment of the color conversion apparatus of the present invention.

As shown in FIG. 13, a color conversion apparatus 1003 includes: an RGB color conversion section 1041 for color-transforming correction object lattice point data inputted from the outside based on an ICC profile of RGB to output PCS data; a CMY (CMYK) color conversion section 1031 for color-transforming the PCS data supplied from the RGB color conversion section 1041 based on the ICC profile of CMY; a correction processing section 1021 for performing correction based on the result of the color conversion by the ICC profiles of RGB and CMYK, that is, the output from the CMY (CMYK) color conversion section 1031; a direct color conversion table 1017 for holding a corrected value produced by the correction processing section; and a direct color conversion section 1018 for referring to the direct color conversion table to convert the RGB values which are the individual lattice points of the RGB color space into arbitrary CMY values of the CMY color space.

The RGB color conversion section 1041 and CMY (CMYK) color conversion section 1031 are connected to an RGB database 1042 in which the ICC profile of RGB is held and a CMY database 1032 in which the ICC profile of CMY (or CMYK) is held, respectively. In the RGB database 1042, ICC profile data which is information indicating the identity of RGB is stored beforehand. In the CMY database 1032, the ICC profile data which is the information indicating the identity of CMY (CMYK) is stored beforehand. It is to be noted that the ICC profile data of the CMY database 1032 includes the color conversion table corresponding to three types of rendering intents (e.g., interpreted as a color reproduction intents) represented by a perceptual intent (for natural images), saturation intent (for business graphic), and relative colorimetric intent (for a proof application) for the color conversion to CMYK from PCS.

Figure 14:
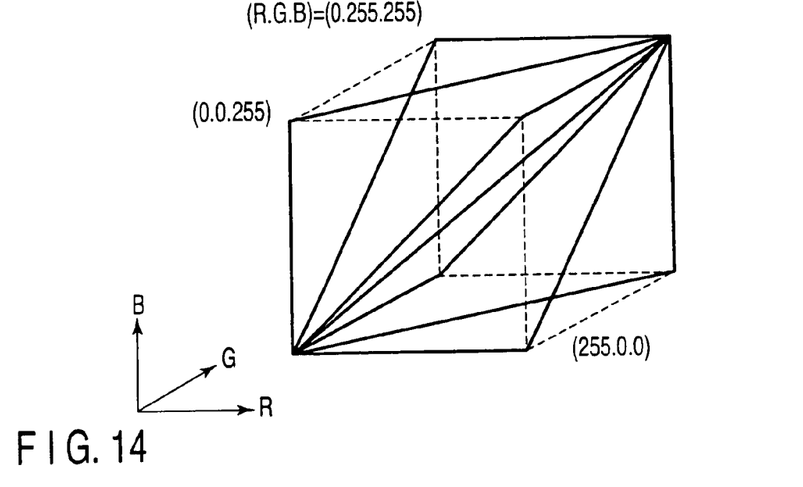
FIG. 14 is a schematic diagram showing the concept of a business graphic important color in a color space of RGB which is a conversion element in the color conversion apparatus shown in FIG. 13.
Figure 15:
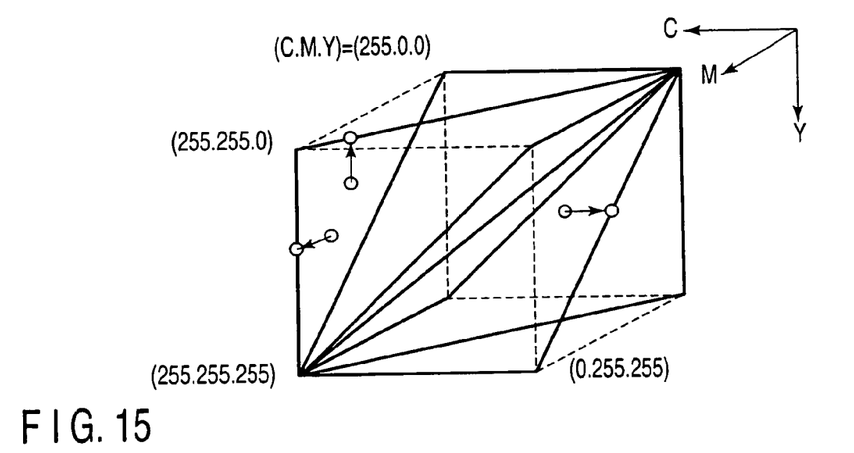
FIG. 15 is a schematic diagram showing the concept of the business graphic important color in the color space of CMY which is a conversion end in the color conversion apparatus shown in FIG. 13.

In the color conversion apparatus 1003 shown in FIG. 13, a set of colors positioned as important colors shown, for example, by a bold line in FIG. 14, that is, important colors in the RGB color space (in the business graphic) of three primary colors in the additive mixed color is mapped in arbitrary colors shown by the bold line in FIG. 15. It is to be noted that, as known, FIG. 14 shows the color range that can be produced by the three primary colors of the additive mixed color in the hexahedron. Three planes defined by connecting diagonal lines extended between two mutually parallel planes from a point including (0, 0, 0) indicate the business graphic important colors in the R, G, B color space.

To map the set of the colors positioned as the important colors as shown in FIG. 14 in the arbitrary colors shown by the bold line in FIG. 15, for corrected amounts in the correction by the correction processing section 1021 described above with reference to FIG. 13, for example, simple complementary color conversion (simple color conversion) represented by the following (hereinafter referred to as first condition) can be applied:

$C=255-R,$ $M=255-G,$ $Y=255-B$ (1)

Moreover, for the corrected amounts in the correction by the correction processing section 1021, for example, color conversion represented by the following (hereinafter referred to as second condition) can be applied:

[a normal extended downwards from a CMY coordinate before the correction with respect to a track of the CMY coordinate obtained by the above-described simple complementary color conversion is obtained as corrected CMY].

Furthermore, for the corrected amounts in the correction by the correction processing section 1021, for example, the color conversion represented by the following (hereinafter referred to as third condition) may be applied:

[a sum of three CMY values before the correction of a noted pixel is regarded as invariant, and mapped on the edge line (bold line of FIG. 15) of the closest CMY space].

In order to verify the color conversion result obtained by referring to the direct color conversion table 1017 formed by the above-described conditions, that is, the colors outputted as the image data to the image output device from the color conversion section 1018, color samples are obtained from the following:

① the result of the color conversion of sRGB image data into CMYK on the respective conditions; and ② the result of the color conversion using the corrected direct color conversion table. Color characteristics are visually compared (evaluated), and the result will hereinafter be described.

It is to be noted that the first condition does not depend on the rendering intent of the ICC profile data held by the CMY database 1032, and only one type of evaluation is performed. With respect to the colors other than the correction object, CMYK image by the saturation intent is used.

By the first condition, satisfactory gradation characteristics are obtained with respect to red (R), yellow (Y), and magenta (M). Moreover, with respect to green (G) and cyan (C), color reproduction is not linear, but continuity (an excessive difference in tint between adjacent color patches is not generated) is maintained. On the other hand, with respect to blue (B), collapse of gradation is caused in a low lightness range.

However, even with respect to blue (B), in the color range of sRGB of L*=30 or more, the level substantially has no problem.

Therefore, when the printed output image is visually checked alone without comparing the image with the display on the monitor side, the print output is "clear and easy to see".

Moreover, since the second condition depends on the rendering intent of the ICC profile data (correction results differs), the data is evaluated with respect to all the rendering intents (in actual, the user selects a specific rendering intent).

In the second condition, in three rendering intents such as the perceptual, saturation, and relative colorimetric intents, for all the color ranges, there is a portion in which a gap is generated in a gradation interval of print outputs, and it has been recognized that there is a room for improvement in order to obtain the output "having no sense of incongruity from the monitor display".

However, in the saturation intent, the gradation of cyan (C) is satisfactory. Moreover, for the hue and chroma in magenta (M) and green (G), the distortion is alleviated.

On the other hand, in the perceptual and relative colorimetric intents, gradation gap and reverse are seen in blue (B) and green (G). However, in the perceptual intent before the correction, tendency for hue congruency with sRGB is confirmed. In the relative colorimetric intent before the correction, the state of hue congruency with sRGB in the printer color range is confirmed. Therefore, with respect to two intents of the perceptual and relative colorimetric intents, without pursuing dramatic processing for the business graphic, the state before the correction is considered to be sufficiently practical.

Therefore, considering from the first and second conditions, as a monitor color matching correction method for the business graphic, a method in which CMY values of the important colors in the business graphic with respect to the direct color conversion table into CMYK from RGB prepared with the saturation intent are replaced with simple complementary color conversion values of sRGB is considered as promising from viewpoints of the holding of the primary colors and gradation.

As described above, according to the color conversion method and apparatus of the present invention, for the color range of the input image, with respect to the colors that can be outputted by the image output device, the color region of a range including the color range is mapped based on the predetermined mapping function defined between the color region and the color conversion table address space. Therefore, the waste of the color conversion table lattice points is inhibited. Conversely, the number of the valid lattice points in the color conversion table increases, and therefore the color conversion accuracy is improved.

Therefore, the color conversion is performed with the high conversion accuracy in association with the colors that can be outputted by the image output device, and the color reproducibility of the output image can be reproduced by the color range intended by the user.

Moreover, for the direct color conversion into CMYK from RGB, the CMY values which are the important colors in the business graphic with respect to the direct color conversion table into CMYK from RGB prepared with the saturation intent are replaced with the simple complementary color conversion values of sRGB. Accordingly, both the primary color holding and the gradation holding can be established.

What is claimed is:

1. A color conversion method comprising:
   calculating a range of color distribution of inputted image data to obtain a result as a color range parameter;
   producing a mapping function to map a color range including the color distribution range represented by the obtained color range parameter in a first color space and conversing the inputted image data by the mapping function,
   producing a first writing address to write the inputted image data converted by the mapping function into a color conversion table,
   producing a second writing address which is an inverse function of the first writing address;
   reading setting data into the color conversion table from a color conversion master database by using of the second writing address;
   reading a second color space from the color conversion table by using a high-order bit of the first writing address and the setting data; and
   converting color referring to second color space data and further interpolating the data to transform color, when the corresponding data does not exist.

2. The color conversion method according to claim 1, wherein the image data is inputted from a scanner.

3. The color conversion method according to claim 1, wherein the image data is inputted from a digital camera.

4. The color conversion method according to claim 1, wherein the mapping function which maps the color range parameter in the first color space subjectively maps a color space of a mapping element in a region (hexahedron) having a volume larger than that of the color space.

5. The color conversion method according to claim 1, wherein the mapping function which maps the color range parameter in the first color space maps a gray point in a color space of a mapping element in a gray axis of a color conversion table address space.

6. The color conversion method according to claim 1, wherein the mapping function which maps the color range parameter in the first color space maps individual vertexes of a hexahedron indicating the color range parameter of a mapping element in the corresponding vertexes of a hexahedron having a larger volume.

7. The color conversion method according to claim 1, wherein the mapping function which maps the color range parameter in the first color space maps individual edge lines of a hexahedron indicating the color range parameter of a mapping element in a side of an outermost boundary of a color conversion table address space.

8. A color conversion apparatus comprising:
   an input image color range extracting section which calculates a color distribution range of inputted image data to output the result as a color range parameter;
   an address map producing section which produces a mapping function to map a color range represented by a first color space including the color distribution range represented by the color range parameter in accordance with a predetermined mapping function;
   an address map calculating section which converts the inputted image data in accordance with the mapping function;
   a color conversion table address producing section which produces a write address into a color conversion table;
   an address inverse map calculating section to inversely map/convert the write address into the color conversion table in accordance with an inverse mapping function which is an inverse function of the mapping function produced by the address map producing section;
   a color conversion master database from which setting data is read using an inverse map result of the color conversion table write address supplied from the address inverse map calculating section as a read address;
   a color conversion table in which the setting data read and supplied from the color conversion master database is written beforehand with respect to the color conversion table write address and from which second color space data is read using a high-order bit of an address map calculation result supplied from the address map calculating section as the read address; and
   a color conversion section which refers to the second color space data read from the color conversion table and which interpolates the data to output a result.

9. The color conversion apparatus according to claim 8, wherein the image data is inputted from a scanner.

10. The color conversion apparatus according to claim 8, wherein the image data is inputted from a digital camera.

11. The color conversion apparatus according to claim 8, wherein the mapping function which maps the color range parameter in the first color space subjectively maps a color space of a mapping element in a region (hexahedron) having a volume larger than that of the color space.

12. The color conversion apparatus according to claim 8, wherein the mapping function which maps the color range parameter in the first color space maps a gray point in a color space of a mapping element in a gray axis of a color conversion table address space.

13. The color conversion apparatus according to claim 8, wherein the mapping function which maps the color range parameter in the first color space maps individual vertexes of a hexahedron indicating the color range parameter of a mapping element in the corresponding vertexes of a hexahedron having a larger volume.

14. The color conversion method according to claim 8, wherein the mapping function which maps the color range parameter in the first color space maps individual edge lines of a hexahedron indicating the color range parameter of a mapping element in a side of an outermost boundary of a color conversion table address space.

15. A color conversion apparatus comprising:
  input image color range extracting means for calculating a color distribution range of inputted image data to output the result as a color range parameter;
  address map producing means for producing a mapping function to subjectively map a color range including the color distribution range represented by the color range parameter in a first color space;
  address map calculating means for converting the inputted image data in accordance with the mapping function;
  color conversion table address producing means for producing a write address into a color conversion table;
  address inverse map calculating means for inversely mapping/converting the write address into the color conversion table in accordance with an inverse mapping function which is an inverse function of the mapping function produced by the address map producing means;
  a color conversion master database from which data is read using an inverse map result of the color conversion table write address supplied from the address inverse map calculating means as a read address;
  a color conversion table in which the data read and supplied from the color conversion master database is written beforehand with respect to the color conversion table write address and from which second color space data is read using a high-order bit of an address map calculation result supplied from the address map calculating means as the read address; and
  color conversion means for referring to the second color space data read from the color conversion table and interpolating the data to output a result.

16. The color conversion apparatus according to claim 15, wherein image data stored in an image memory for each input object and stored beforehand in the image memory for the color conversion is used as the image data for use in the calculation of the range of the color distribution.

17. The color conversion apparatus according to claim 15, wherein the image data for use in the calculation of the range of the color distribution is acquired by pre-scanning of the input object, and the same input object is scanned again for the color conversion.

* * * * *